US009526110B2

(12) United States Patent
Andrianov et al.

(10) Patent No.: US 9,526,110 B2
(45) Date of Patent: Dec. 20, 2016

(54) TECHNIQUES FOR MULTI-RAT (RADIO ACCESS TECHNOLOGY) COORDINATED RESOURCE SHARING

(71) Applicant: Nokia Solutions and Networks Oy, Espoo (FI)

(72) Inventors: Anatoly Andrianov, Schaumburg, IL (US); James Kepler, Buffalo Grove, IL (US); Ravindra Moorut, Tower Lakes, IL (US); Rapeepat Ratasuk, Hoffman Estates, IL (US); Joseph Schumacher, Glen Ellyn, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 325 days.

(21) Appl. No.: 14/185,327

(22) Filed: Feb. 20, 2014

(65) Prior Publication Data
US 2015/0237645 A1    Aug. 20, 2015

(51) Int. Cl.
*H04W 4/00* (2009.01)
*H04W 72/12* (2009.01)

(52) U.S. Cl.
CPC ................ *H04W 72/1215* (2013.01)

(58) Field of Classification Search
CPC .................................. H04W 72/1215
See application file for complete search history.

(56) References Cited

U.S. PATENT DOCUMENTS

| 7,664,467 | B2 * | 2/2010 | Cheng | H04W 72/005 370/253 |
| 8,982,846 | B2 * | 3/2015 | Baker | 370/332 |
| 2008/0219286 | A1 * | 9/2008 | Ji | H04L 12/413 370/445 |
| 2008/0225783 | A1 | 9/2008 | Wang et al. | |
| 2008/0274738 | A1 * | 11/2008 | Li | H04L 45/02 455/435.1 |
| 2009/0003303 | A1 * | 1/2009 | Zhu | H04W 72/1215 370/345 |
| 2011/0007689 | A1 * | 1/2011 | Shen | H04W 92/20 370/328 |
| 2011/0130099 | A1 * | 6/2011 | Madan | H04W 72/1226 455/63.1 |

(Continued)

FOREIGN PATENT DOCUMENTS

WO    2011/046477 A1    4/2011

*Primary Examiner* — Jay P Patel
(74) *Attorney, Agent, or Firm* — Brake Hughes Bellermann LLP

(57) ABSTRACT

A technique is provided for receiving a resource request by a first base station (BS) of a first Radio Access Technology (RAT) from one or more user devices, selecting resources, from a group of resources shared by BSs of a plurality of different RATs, to be scheduled for the one or more requesting user devices, scheduling, by the first BS, the selected resources for the one or more user devices, and sending, from the first BS, a resource scheduling announcement identifying the scheduled resources to one or more other BSs including at least a second BS of a second RAT. Another example technique may include receiving a resource scheduling request from a first base station (BS) implementing a first RAT, confirming an availability of the requested resources, and sending a first resource scheduling announcement to one or more BSs implementing other RATs.

20 Claims, 9 Drawing Sheets

(56) References Cited

U.S. PATENT DOCUMENTS

| | | | |
|---|---|---|---|
| 2012/0140743 A1 | 6/2012 | Pelletier et al. | |
| 2012/0164948 A1* | 6/2012 | Narasimha | H04W 72/1215 455/63.1 |
| 2012/0184265 A1* | 7/2012 | Love | H04W 72/1215 455/424 |
| 2012/0243488 A1* | 9/2012 | Gupta | H04W 72/0426 370/329 |
| 2013/0023276 A1* | 1/2013 | Du | H04B 7/024 455/452.1 |
| 2013/0077554 A1* | 3/2013 | Gauvreau | H04L 5/001 370/312 |
| 2013/0077599 A1* | 3/2013 | Dimou | H04W 36/22 370/331 |
| 2013/0159531 A1 | 6/2013 | Katyal et al. | |
| 2013/0189976 A1* | 7/2013 | Kim | H04W 72/0406 455/434 |
| 2013/0210445 A1* | 8/2013 | Nakamura | H04W 16/32 455/448 |
| 2013/0322346 A1* | 12/2013 | Comeau | H04W 80/02 370/329 |
| 2013/0329596 A1* | 12/2013 | Shirakabe | H04W 16/10 370/252 |
| 2013/0343291 A1* | 12/2013 | Gao | H04W 52/244 370/329 |
| 2014/0286295 A1* | 9/2014 | Liu | H04W 72/10 370/329 |
| 2014/0308953 A1* | 10/2014 | Park | H04W 76/026 455/436 |
| 2015/0092573 A1* | 4/2015 | Zhang | H04W 24/10 370/252 |
| 2015/0105114 A1* | 4/2015 | Chou | H04W 4/006 455/509 |
| 2015/0119053 A1* | 4/2015 | Morimoto | H04W 16/08 455/450 |
| 2015/0126237 A1* | 5/2015 | Nagata | H04W 52/54 455/522 |
| 2015/0189638 A1* | 7/2015 | Lin | H04W 16/02 370/330 |
| 2015/0351117 A1* | 12/2015 | Rahman | H04L 5/1469 370/252 |
| 2016/0007361 A1* | 1/2016 | Andersson | H04L 5/0053 370/329 |

* cited by examiner

TECHNIQUES FOR MULTI-RAT (RADIO ACCESS TECHNOLOGY) COORDINATED RESOURCE SHARING

TECHNICAL FIELD

This description relates to wireless networks.

BACKGROUND

In some cases, regulatory authorities may allocate a portion of wireless spectrum to multiple wireless operators simultaneously with the expectation or requirement that such operators would share the allocated wireless spectrum. In some cases, wireless operators sharing a wireless spectrum may employ the same or similar RAT that may permit at least some communication between wireless systems of different wireless operators. In other cases, different operators may use different Radio Access Technologies (RATs). Each of the systems used by the wireless operators, may use a different RAT, and therefore, may have different protocols, frame requirements, timing, bandwidths, power level, etc., and other differences. For example, wireless operators may include mobile network operators or commercial wireless operators, as well as any authorized spectrum user like hospitals, utilities, emergency services, private users, corporations, etc. There are many challenges in coordinating the usage of a shared wireless spectrum.

SUMMARY

According to an example implementation, a method of coordinating usage of wireless resources includes receiving a resource request by a first base station (BS) of a first Radio Access Technology (RAT) from one or more user devices, selecting resources, from a group of resources shared by BSs of a plurality of different RATs, to be scheduled for the one or more requesting user devices, scheduling, by the first BS, the selected resources for the one or more user devices, sending, from the first BS, a resource scheduling announcement identifying the scheduled resources to one or more other BSs including at least a second BS of a second RAT, and sending a resource grant message to each of the one or more user devices.

In an example implementation, the selecting resources may include selecting aggregate resources that include wireless resources for uplink communications from one or more user devices to the first BS and wireless resources for downlink communications from the first BS to one or more user devices.

In an example implementation, the resource request and the resource grant message are specific to the first RAT.

In an example implementation, the resource scheduling announcement is RAT-neutral.

In an example implementation, the method further includes maintaining, by the first BS, a list of available resources from the group of resources shared by the BSs, and wherein the scheduling includes: scheduling, by the first BS, the selected resources for the one or more user devices based on the resource request and the available resources.

In an example implementation, the method includes receiving a resource request by the first BS of the first RAT from a plurality of user devices, selecting aggregate resources, from the group of resources shared by BSs of a plurality of different RATs, to be scheduled for the plurality of requesting user devices, scheduling, by the first BS, the selected aggregate resources for the plurality of user devices, wherein the scheduled aggregate resources including an aggregate of resources to be scheduled for or granted to each requesting user device, and sending a resource scheduling announcement identifying the scheduled aggregate resources to one or more other BSs including at least a second BS of a second RAT.

In an example implementation, the resource scheduling announcement causes at least the second BS to update a list of available resources maintained by the second BS to reflect that the scheduled resources will be occupied or unavailable.

In an example implementation, the resource request includes information identifying the requesting user device, a buffer status or transmission priority for the user device, and an amount of data to be transmitted or an amount of resources requested.

In an example implementation, the scheduling announcement includes information identifying the scheduled resources, information identifying the first BS that is sending the scheduling announcement, and information identifying a coverage area for the scheduled resources.

In an example implementation, the resource grant message sent by the first BS to each requesting user device includes information identifying the requesting user device for which the resource grant message is being sent to, information identifying the first BS that is sending the resource grant message, and information identifying the resources being granted or allocated to the requesting user device.

In an example implementation, the sending the resource scheduling announcement includes sending, from the first BS via a portion of the group of resources shared by BSs of a plurality of different RATs, the resource scheduling announcement identifying the scheduled resources to one or more other BSs including at least the second BS of the second RAT.

In an example implementation, the sending the resource scheduling announcement includes sending, from the first BS via resources, either wired or wireless, outside of the group of resources shared by BSs of a plurality of different RATs, the resource scheduling announcement identifying the scheduled resources to one or more other BSs including at least the second BS of the second RAT.

According to another example implementation, an apparatus includes at least one processor and at least one memory including computer instructions, when executed by the at least one processor, cause the apparatus to: receive a resource request by a first base station (BS) of a first Radio Access Technology (RAT) from one or more user devices, select resources, from a group of resources shared by BSs of a plurality of different RATs, to be scheduled for the one or more requesting user devices, schedule, by the first BS, the selected resources for the one or more user devices, send, from the first BS, a resource scheduling announcement identifying the scheduled resources to one or more other BSs including at least a second BS of a second RAT, and send a resource grant message to each of the one or more user devices.

In an example implementation, a computer program product includes a non-transitory computer-readable storage medium and storing executable code that, when executed by at least one data processing apparatus, is configured to cause the at least one data processing apparatus to perform a method including receiving a resource request by a first base station (BS) of a first Radio Access Technology (RAT) from one or more user devices, selecting resources, from a group of resources shared by BSs of a plurality of different RATs, to be scheduled for the one or more requesting user devices, scheduling, by the first BS, the selected resources for the one or more user devices, sending, from the first BS, a resource scheduling announcement identifying the scheduled resources to one or more other BSs including at least a second BS of a second RAT, and sending a resource grant message to each of the one or more user devices.

In another example implementation, a method of coordinating usage of wireless resources includes receiving a first resource scheduling announcement from a first base station (BS) implementing a first Radio Access Technology (RAT), the first resource scheduling announcement provided to schedule resources from a group of resources shared by BSs of a plurality of different RATs, the first resource scheduling announcement identifying at least the first BS and the resources scheduled by the first BS for the first BS, the first resource scheduling announcement provided in accordance with the first RAT, and sending a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, the sending includes generating the second resource scheduling announcement based on one or more fields included in the first resource scheduling announcement and requirements of the second RAT, and sending the generated second resource scheduling announcement to at least a second BS implementing a second RAT.

In an example implementation, the first resource scheduling announcement includes a plurality of fields provided in a format in accordance with requirements of or a specification of the first RAT, and wherein the second resource scheduling announcement includes a plurality of fields provided in a format in accordance with requirements of or a specification of the second RAT.

In an example implementation, the first resource scheduling announcement is received from the first BS via a first communications medium and a first communications protocol, and wherein the second resource scheduling announcement is received from the first BS via a second communications medium and a second communications protocol.

In an example implementation, the first communications medium and the first communications protocol are different from the second communications medium and the second communications protocol, respectively.

In an example implementation, the method may further include sending a third resource scheduling announcement to at least a third BS implementing a third RAT, the third resource scheduling announcement identifying the first BS and the resources scheduled for the first BS, the third resource scheduling announcement provided in accordance with the third RAT.

In an example implementation, the method may further include sending a third resource scheduling announcement to one or more BSs implementing the first RAT, including sending the third resource scheduling announcement to the first BS implementing the first RAT, the third resource scheduling announcement identifying the first BS and the resources scheduled for the first BS, the third resource scheduling announcement provided in accordance with the first RAT.

In an example implementation, an apparatus may include at least one processor and at least one memory including computer instructions, when executed by the at least one processor, cause the apparatus to: receive a first resource scheduling announcement from a first base station (BS) implementing a first Radio Access Technology (RAT), the first resource scheduling announcement provided to schedule resources from a group of resources shared by BSs of a plurality of different RATs, the first resource scheduling announcement identifying at least the first BS and the resources scheduled by the first BS for the first BS, the first resource scheduling announcement provided in accordance with the first RAT, and send a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, a computer program product includes a non-transitory computer-readable storage medium and storing executable code that, when executed by at least one data processing apparatus, is configured to cause the at least one data processing apparatus to perform a method including: receiving a first resource scheduling announcement from a first base station (BS) implementing a first Radio Access Technology (RAT), the first resource scheduling announcement provided to schedule resources from a group of resources shared by BSs of a plurality of different RATs, the first resource scheduling announcement identifying at least the first BS and the resources scheduled by the first BS for the first BS, the first resource scheduling announcement provided in accordance with the first RAT, and sending a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, a method of coordinating usage of wireless resources includes receiving a resource scheduling request from a first base station (BS) implementing a first Radio Access Technology (RAT), the resource scheduling request provided to schedule resources from a group of resources shared by BSs of a plurality of different RATs, the resource scheduling request identifying at least the first BS and the resources requested for the first BS, the resource scheduling request provided in accordance with the first RAT, confirming an availability of the requested resources, sending a first resource scheduling announcement to one or more BSs implementing the first RAT including at least the first BS, the first resource scheduling announcement identifying the first BS and the resources scheduled for the first BS, and sending a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, the resource scheduling request requests aggregate resources based on resource requests from each of a plurality of user devices to the first BS.

In an example implementation, the method further includes updating a list of available resources to reflect that the requested resources will be unavailable or occupied.

In an example implementation, the sending the first resource scheduling announcement to one or more BSs implementing the first RAT including at least the first BS includes sending, via a first communications medium, the first resource scheduling announcement to one or more BSs implementing the first RAT including at least the first BS, the first resource scheduling announcement being in accordance with requirements or a specification of the first RAT, and the sending the second resource scheduling announcement to one or more BSs implementing the second RAT includes sending, via a second communications medium, the second resource scheduling announcement to one or more BSs implementing the second RAT, the second resource scheduling announcement being in accordance with requirements or a specification of the second RAT.

In an example implementation, the confirming includes comparing the requested resources to a list of available resources of the group of resources shared by BSs of a plurality of different RATs, and confirming the availability of the requested resources based on the comparing.

In an example implementation, the method further includes receiving a resource scheduling request from a third base station (BS) implementing the second RAT for the same requested resources as requested by the first BS, and wherein the confirming includes allocating the requested resources, if available, to either the first BS or the third BS based on a priority for each.

In an example implementation, the priority includes at least one of: a priority included within each of the resource scheduling requests, a priority for each of the first BS and the third BS, a RAT priority for each of the first RAT and the second RAT, and a system priority for each of the first BS and the third BS, where the first BS is part of a first wireless system that implements the first RAT, and the third BS is part of a second wireless system that implements the second RAT.

In an example implementation, a computer program product includes a non-transitory computer-readable storage medium and storing executable code that, when executed by at least one data processing apparatus, is configured to cause the at least one data processing apparatus to perform a method including: receiving a resource scheduling request from a first base station (BS) implementing a first Radio Access Technology (RAT), the resource scheduling request provided to schedule resources from a group of resources shared by BSs of a plurality of different RATs, the resource scheduling request identifying at least the first BS and the resources requested for the first BS, the resource scheduling request provided in accordance with the first RAT, confirming an availability of the requested resources, sending a first resource scheduling announcement to one or more BSs implementing the first RAT including at least the first BS, the first resource scheduling announcement identifying the first BS and the resources scheduled for the first BS, and sending a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, an apparatus includes at least one processor and at least one memory including computer instructions, when executed by the at least one processor, cause the apparatus to: receive a resource scheduling request from a first base station (BS) implementing a first Radio Access Technology (RAT), the resource scheduling request provided to schedule resources from a group of resources shared by BSs of a plurality of different RATs, the resource scheduling request identifying at least the first BS and the resources requested for the first BS, the resource scheduling request provided in accordance with the first RAT, confirm an availability of the requested resources, send a first resource scheduling announcement to one or more BSs implementing the first RAT including at least the first BS, the first resource scheduling announcement identifying the first BS and the resources scheduled for the first BS, send a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, a method includes receiving a resource scheduling request from a first base station (BS) implementing a first Radio Access Technology (RAT), the resource scheduling request identifying the first BS, an amount of data for transmission or an amount of resources requested and provided in accordance with the first RAT, scheduling, based on available resources and the resource scheduling request, resources from a group of resources shared by at least two BSs or wireless networks that implement different RATs, sending a first resource scheduling announcement to one or more BSs implementing the first RAT including at least the first BS, the first resource scheduling announcement identifying the first BS and the resources scheduled for the first BS, the first resource scheduling announcement provided in accordance with the first RAT, and sending a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, a computer program product includes a non-transitory computer-readable storage medium and storing executable code that, when executed by at least one data processing apparatus, is configured to cause the at least one data processing apparatus to perform a method including: receiving a resource scheduling request from a first base station (BS) implementing a first Radio Access Technology (RAT), the resource scheduling request identifying the first BS, an amount of data for transmission or an amount of resources requested and provided in accordance with the first RAT, scheduling, based on available resources and the resource scheduling request, resources from a group of resources shared by at least two BSs or wireless networks that implement different RATs, sending a first resource scheduling announcement to one or more BSs implementing the first RAT including at least the first BS, the first resource scheduling announcement identifying the first BS and the resources scheduled for the first BS, the first resource scheduling announcement provided in accordance with the first RAT, and sending a second resource scheduling announcement to at least a second BS implementing a second RAT, the second resource scheduling announcement identifying the first BS and the resources scheduled for the first BS, the second resource scheduling announcement provided in accordance with the second RAT.

In an example implementation, an apparatus including at least one processor and at least one memory including computer instructions, when executed by the at least one processor, cause the apparatus to: receiving a resource scheduling request from a first base station (BS) implementing a first Radio Access Technology (RAT), the resource scheduling request identifying the first BS, an amount of data for transmission or an amount of resources requested and provided in accordance with the first RAT, scheduling, based on available resources and the resource scheduling request, resources from a group of resources shared by at least two BSs or wireless networks that implement different RATs, sending a first resource scheduling announcement to one or more BSs implementing the first RAT including at least the first BS, the first resource scheduling announcement identifying the first BS and the resources scheduled for the first BS, the first resource scheduling announcement provided in accordance with the first RAT, and sending a second resource scheduling announcement to at least a second BS implementing a second RAT, the second resource scheduling announcement identifying the first BS and the resources scheduled for the first BS, the second resource scheduling announcement provided in accordance with the second RAT.

The details of one or more implementations are set forth in the accompanying drawings and the description below. Other features will be apparent from the description and drawings, and from the claims.

DETAILED DESCRIPTION

Figure 1:
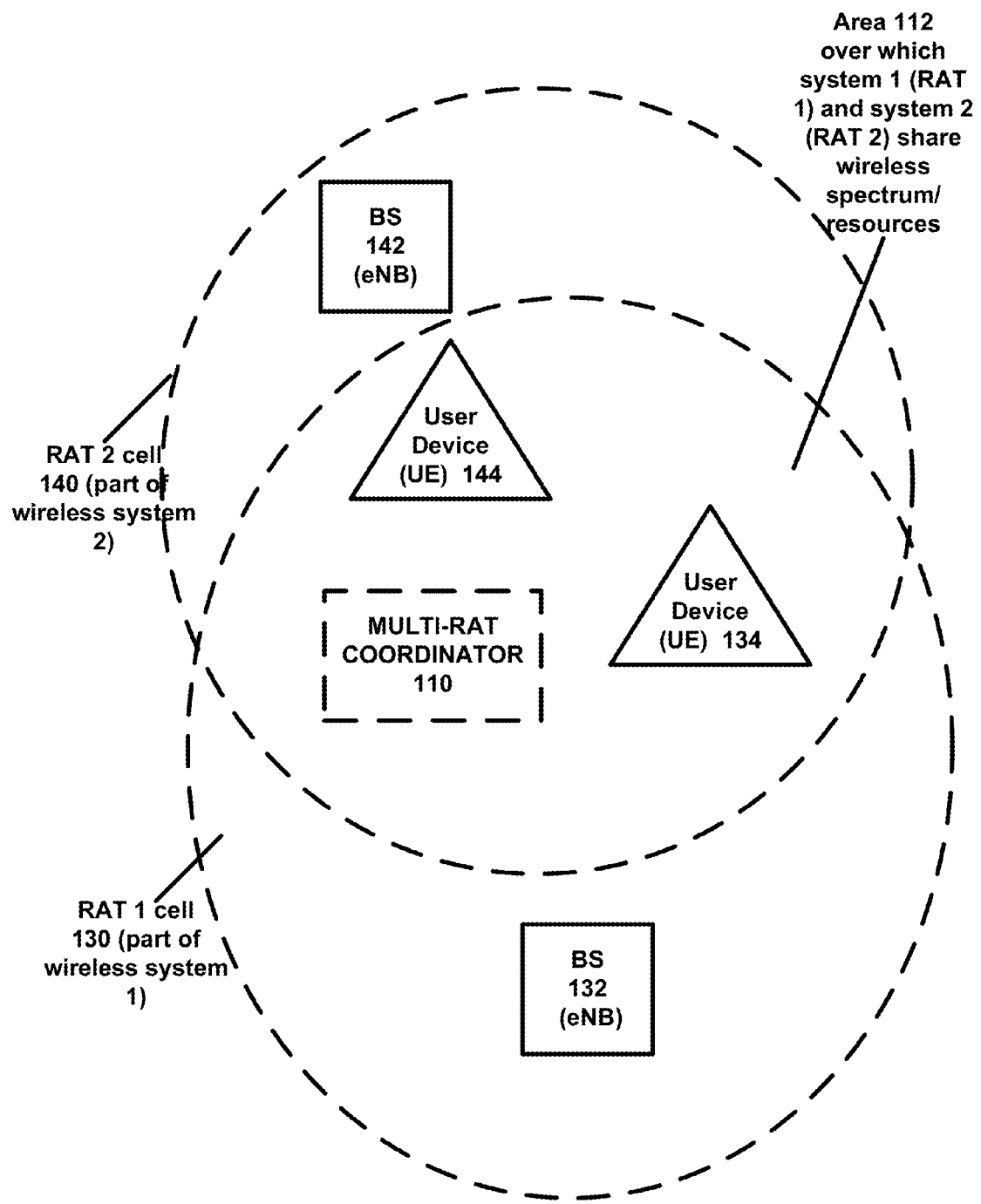
FIG. 1 is a block diagram illustrating a sharing of wireless spectrum or wireless resources by two wireless systems according to an example implementation.

FIG. 1 is a block diagram illustrating a sharing of wireless spectrum or wireless resources by two wireless systems according to an example implementation. Wireless system 1 may include one or more base stations (BSs) such as BS 132 that may provide wireless services within cell 130. Multiple user devices or user equipments (UEs), including user device 134, may be connected (and in communication) with BS 132. BSs may also be referred to as enhanced Node Bs (eNBs) in the case where the radio access technology (RAT) is LTE, but may have other names for other RATs. Wireless system 2 may similarly include one or more BSs, such as a BS 142 that provides wireless services within cell 140. A plurality of user devices, including user device 144, may be connected to and in communication with BS 142. While only one user device is shown for each cell, multiple user devices may be connected (and in communication) with each BS.

According to an example implementation, at least part of the functionalities of a base station (BS) or (e)Node B may be also be carried out by any node, server or host which may be operably coupled to a transceiver, such as a remote radio head. For example, in a device-to-device (D2D) or proximity services (ProSe) network, some of the functionality of a BS, including the communication between BSs (or from cluster head to other BSs) as described herein, may be performed by a cluster head (or other control entity) of a D2D wireless network. Although not shown, each of the BSs may be connected together via one or more communication links, such as a wired link or a wireless communications link. Also, one or more of the BSs may also be connected to a core network, e.g., via a S1 interface or other interface. This is merely one simple example of a wireless network, and others may be used.

An area 112 is shown, e.g., illustrating overlap of cells 140 and 130, where wireless system 1 and wireless system 2 may be sharing wireless spectrum or wireless resources. While BSs are shown for only two wireless systems, any number of wireless systems may share wireless spectrum or wireless resources.

A user device (user terminal, user equipment (UE)) may refer to a stationary (e.g., non-portable) computing device or a portable computing device that includes wireless mobile communication devices operating with or without a subscriber identification module (SIM), including, but not limited to, the following types of devices: a mobile station, a mobile phone, a cell phone, a smartphone, a personal digital assistant (PDA), a handset, a device using a wireless modem (alarm or measurement device, a patient medical monitoring device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network. A user device may also include downlink-only devices, or devices that primarily receive downlink communications, such as a pager.

According to an example implementation, wireless systems that share wireless spectrum or resources may use or implement different radio access technologies (RATs). For example, wireless system 1, including BS 132 and user device 134, may use or implement RAT 1. While wireless system 2, including BS 142 and user device 144, may use or implement RAT 2. FIG. 1 merely shows only two wireless systems implementing two different RATs. Other wireless systems may share the same wireless resources and may use or implement RAT 1, RAT 2, or another RAT (e.g., RAT 3, RAT 4 . . . ). For example, different wireless operators may operate systems that implement different RATs.

A RAT may include an underlying connection method or communication method for a radio based communication network. A RAT, for example, at least in some cases, may be defined, at least in part, by a specification that may define various aspects or various requirements of the RAT, such as, for example, physical characteristics of signals to be transmitted and received, such as modulation rates and coding schemes to be used, power levels and signal timing, and other RAT characteristics, such as protocols or handshaking sequences, frame or message formats and functionality as required by the RAT. These are merely some examples of details that may be specified by a RAT, and many other details may be required or specified.

A wide variety of RATs may be used, such as, for example, one or more of the RATs defined by the following specifications or standards: an IEEE 802.11 wireless local area network (WLAN) (also known as Wi-Fi), GSM (Global System for Mobile Communications) (also known as 2G), International Mobile Telecommunications-2000 (IMT-2000) specifications by the International Telecommunication Union (also known as 3G), and various wireless 4G technologies, such as the long-term evolution (LTE) of the Universal Mobile Telecommunications System (UMTS) radio-access technology or an 802.16 wireless metropolitan area network (WiMAX), Bluetooth, and various other wireless or paging technologies that may be implemented by hospitals, medical facilities, schools, emergency personnel, and other wireless communication technologies. Also, a RAT may also include technologies that use wireless spectrum or wireless resources for non-communication purposes, such as for medical treatment (e.g., radiation or other medical treatment of patients), and Radar, as examples. These are merely a few example RATs that may share wireless spectrum or resources. In each of these technologies, at least in some cases, a base station (or control entity) may be provided.

In some cases, the BSs of each wireless system, which may use different RATs, may communicate directly, e.g., via a RAT-neutral (e.g., not limited to just one RAT) message(s) that BSs of multiple RATs may have agreed upon for coordinating the sharing of wireless resources. Alternatively, one or more BSs may be multi-mode BSs that can communicate via both RAT 1 and RAT 2. For example, BS 132 and BS 142 may both implement hardware and software to implement both WLAN (e.g., IEEE 802.11) and LTE. Thus, while BS 132 may be primarily a WLAN BS, and BS 142 may primarily be a LTE BS (or eNB), both BSs 132 and 142 may communicate with each other to coordinate the use of a shared wireless spectrum/resources.

In another alternative implementation, a multi-RAT coordinator 110 (FIG. 1) may be provided to provide an interface between multiple RATs (or to interface between BSs of different RATs). In an example implementation, multi-RAT coordinator 110 may include the hardware and software required to implement multiple RATs. For example, multi-RAT coordinator 110 may include a first wireless transceiver and protocol stack to implement LTE, a second wireless transceiver and protocol stack to implement WLAN, and a third wireless transceiver and protocol stack to implement a wireless RAT used by a hospital or emergency personnel. Multi-RAT coordinator 110 may be a separate wireless station (or a separate physical entity), or may be a logical entity within one of the BSs, for example. This is merely one illustrative example, and others may be used.

Several different example implementations will now be described with reference to FIGS. 2-4. In a first implementation (FIG. 2), a BS of (or implementing) a first RAT schedules resources for itself from a group of shared wireless resources, and then sends via the shared wireless resources a resource scheduling announcement to other BSs, including to a second BS of (or implementing) a second RAT. In a second implementation (also FIG. 2), the first BS sends the resource scheduling announcement to other BSs via resources, either wired or wireless, other than the shared wireless spectrum/resources. In a third example implementation (FIG. 3), a first BS, implementing a first RAT, schedules resources from a group of shared wireless resources, and then sends a resource scheduling announcement, in accordance with the first RAT, to a multi-RAT coordinator. The multi-RAT coordinator may then send a second resource scheduling announcement in accordance with a second RAT, to at least a second BS implementing the second RAT, identifying resources of the shared wireless resources that have been scheduled for the first BS. In a fourth example implementation (FIG. 4), a first BS, implementing a first RAT sends a first resource scheduling request identifying requested resources in accordance with a first RAT to a multi-RAT coordinator. The multi-RAT coordinator confirms an availability of the requested resources, and then sends a first resource scheduling announcement to one or more BSs implementing the first RAT, and sends a second resource scheduling announcement to one or more BSs implementing a second RAT. In a fifth example implementation (also FIG. 5), a multi-RAT coordinator receives the resource scheduling request from the first BS and schedules resources for the first BS. The multi-RAT coordinator then sends a first resource scheduling announcement, provided in accordance with the first RAT, identifying the scheduled resources to one or more BSs that implement the first RAT, and sends a second resource scheduling announcement, provided in accordance with a second RAT, identifying the scheduled resources to one or more BSs that implement the second RAT. Each of these example implementations will be briefly described below with respect to FIGS. 2-4.

Figure 2:
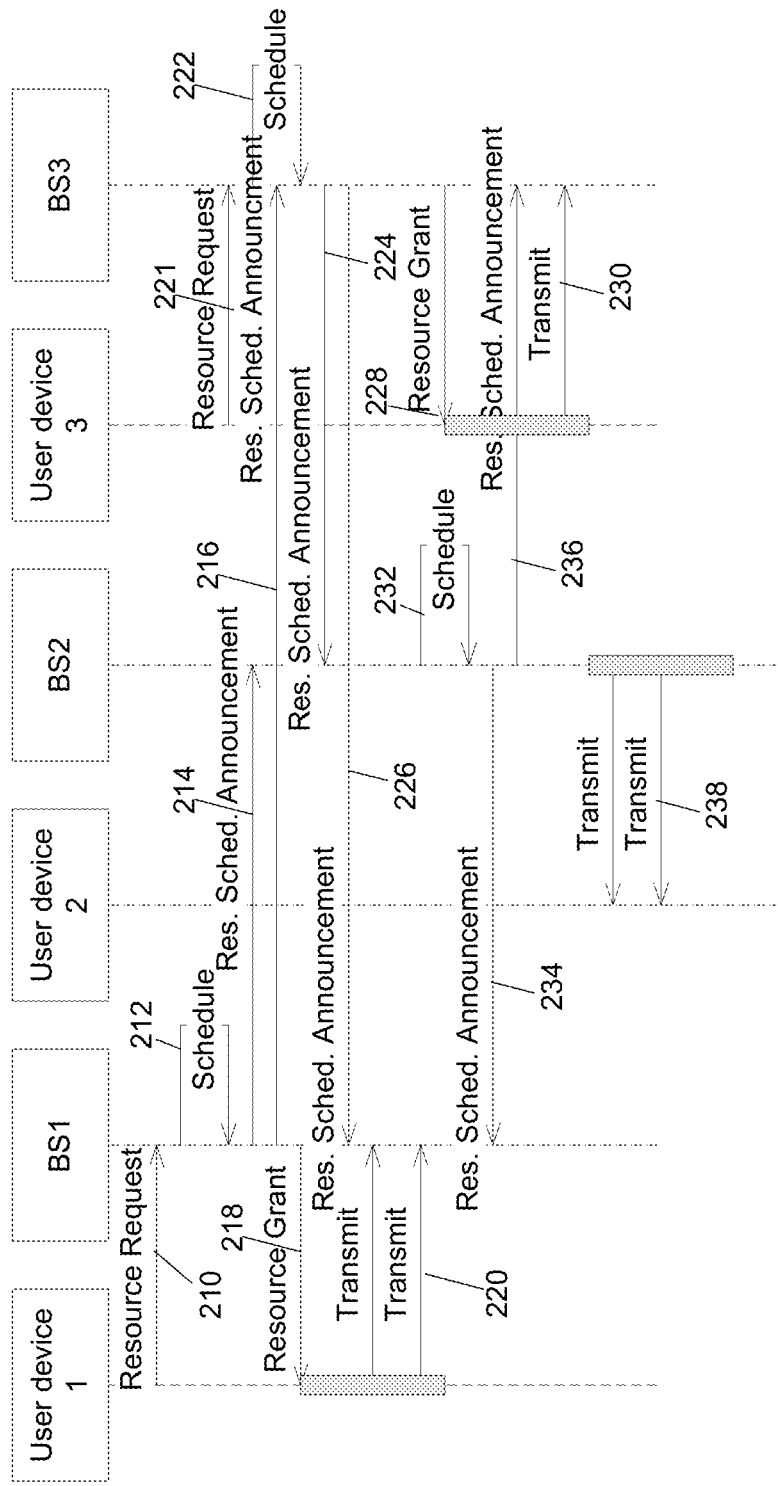
FIG. 2 is a signal diagram illustrating operation of a first example implementation and a second example implementation.

FIG. 2 is a signal diagram illustrating operation of a first example implementation and a second example implementation. According to an example implementation, user device 1 and BS1 implement RAT 1 (or a first RAT); user device 2 and BS2 implement RAT 2 (or a second RAT); and user device 3 and BS3 may implement RAT 3 (or a third RAT). For example, BS1, BS2 and BS3, although implementing different RATs, may share a group of wireless resources or wireless spectrum. According to a first example implementation, BS1 receives a resource request at 210 from user device 1, where the resource request may include, for example, information identifying the requesting user device 1 (e.g., user device ID), and a buffer status or transmission priority of the requesting user device, and an amount of data or an amount of resources requested, as example fields.

The type of requested resources (or the parameters or fields used to identify requested resources) may, for example, vary based on the RAT that is implemented. For example, a frequency band or subcarrier may be specified, or a number of time slots or subframes may be requested for a TDD (time division duplex) system, and for other RATs, a user device may request a number of symbols, such as a number of Orthogonal Frequency Division Multiplex Access (OFDMA) symbols for transmitting data. These are merely a few examples, and other techniques may be used to identify or allocate resources. In general, various types of multiplexing may be used to divide up the shared resources/spectrum, such as frequency division multiplexing, time division multiplexing, and/or code division multiplexing, as example.

Referring to FIG. 2, BS1 may select resources, from a group of resources shared by at least two BSs implementing different RATs, to be scheduled for the requesting user device. Similarly, BS1 may receive resource requests from other user devices, not shown. At 212, BS1 may schedule (or make a scheduling decision for) resources (or the selected resources) for the one or more requesting user devices. For example, BS1 (and the other BSs) may maintain a list of available resources of the group of shared resources. A resource may be removed from the list of available resources, or marked as occupied or unavailable, when the BS1 receives a resource scheduling announcement (either from other BSs or from multi-RAT coordinator 110) for such resource, for example. In this manner, BS1 (and other BSs) may update its list of available resources based on received resource scheduling announcements and resources that itself has scheduled and announced. Based on this list of available resources and the resource request(s) received from one or more user devices, BS1 may schedule (e.g., locally schedule, or make a local scheduling decision) for aggregate resources (or total resources) that will meet or satisfy the resource requests received from one or more user devices, and for downlink resources that BS1 may need.

According to an example implementation, a BS that is the first BS to announce a resource reservation (e.g., via resource scheduling announcement) to other BSs (and/or relayed via a multi-RAT coordinator 110) may obtain the announced resource. Thus, according to an example implementation, a contention-based resource scheduling system may be implemented in which resources may be scheduled to a BS that is first to announce such scheduled/reserved resource. If more than one BS announces a scheduled/reserved resource for the same or overlapping resource, then the BS having a highest priority, for example, may obtain the resources.

BS1 may send one or more resource scheduling announcements to other BSs, identifying the (aggregate) scheduled resources for BS1, information identifying the BS for which the resources have been reserved (e.g., BSID for BS1), and/or information identifying that BS1 (the BS receiving the resources) is implementing RAT 1 (a RAT ID). Other or different fields may be included. For example, the resource scheduling announcement(s) may also identify a geographic area or location associated with the scheduled resources to allow other BSs to determine whether a conflict or interference in using such (same) resources may exist with another BS. A location of each BS and/or range of each BS may be pre-exchanged with other BSs that are sharing the group of wireless resources, and in such case, such location or geographic area may be omitted. In one example implementation, the one or more resource scheduling announcements may be RAT-neutral (e.g., not specific to one RAT, or may be in a format that multiple RATs have adopted to allow the announcement to be received and decoded by the receiving BS), or may be RAT-specific (e.g., specific to, or in accordance with/compliant with a RAT, such as RAT 1 in this case).

According to a first example implementation, the one or more resource scheduling announcements may be sent via some (or a portion) of the group of wireless resources that are shared by at least two BSs implementing different RATs. In a second example implementation, the one or more resource scheduling announcements may be sent via resources, either wired or wireless, that are outside of the group of wireless resources shared by the at least two BSs implementing different RATs.

For example, in the case where RAT-specific resource scheduling announcements are sent, BS1 may send a first resource scheduling announcement (not shown) to one or more other BSs that implement the first RAT (or RAT 1). The first resource scheduling announcement may be provided in accordance with RAT 1, e.g., may be sent via coding and modulation, timing, frame format, etc., and via a communications medium as required by RAT 1. For example, if RAT 1 includes LTE, then the first resource scheduling announcement may be sent as a LTE message sent via Ethernet connection as a TCP/IP (transmission control protocol/internet protocol) message or frame, as an example.

Similarly, at 214, BS1 may send a second resource scheduling announcement to one or more BSs (including BS2) that implement a second RAT (or RAT 2). The second resource scheduling announcement is provided in accordance with RAT 2, e.g., providing a frame with a frame format, and signals sent via coding and modulation, timing, etc. as required by RAT 2. For example, if RAT 2 is WLAN, then the second resource scheduling announcement at 214 may be sent as a 802.11/WLAN message via the shared group of resources or other wireless channel to BS2.

Similarly, at 216, BS1 may send a third resource scheduling announcement to one or more BSs that implement a third RAT (or RAT 3), including BS3. The third resource scheduling announcement may be provided in accordance with (e.g., compliant with) the third RAT. For example, if the third RAT is a wireless paging network at a hospital, then the third resource scheduling announcement at 216 may be sent as a message compliant with the requirements of the wireless paging network and sent via a T1 connection, for example.

Thus, BS1 may send one or more resource scheduling announcements to indicate to other BSs that are sharing the group of shared wireless resources that the identified wireless resources have been scheduled (or reserved) for BS1. These resource scheduling announcements may be sent as RAT-neutral message(s), which may be understood (e.g., received and decoded) by BSs of multiple RATs (e.g., RATs may be modified to allow transmission of such RAT-neutral announcements to facilitate multi-RAT resource sharing). Alternatively, BS1 may send the first, second and third resource scheduling announcements in accordance with its RAT (or the first RAT) as a RAT-specific message, specific to RAT 1, and the receiving BSs may be expected to receive and decode the RAT 1 message. The other BSs may be expected to receive and decode RAT 1 messages if, for example, they are dual-mode BSs, and include a RAT 1 wireless transceiver and protocol stack, which may be another alternative example implementation.

Therefore, according to an example implementation, the resource scheduling announcement may identify aggregate resources scheduled (or reserved) for BS1, including, for example, uplink resources scheduled based on resource requests from multiple user devices, and downlink resources for BS1 to use for downlink communication, for example. The BSs that receive the resource scheduling announcement, e.g., including at least BS2, and BS3, may remove such identified wireless resources from their maintained list of available (or free) wireless resources, or may mark such scheduled resources as occupied or unavailable (or temporarily occupied). According to an example implementation, the resource scheduling announcements sent by BS1 may include or identify a time interval when BS1 uses or will be using the wireless resources.

Referring to FIG. 2, at 218, BS1 may send a resource grant message to each user device that requested resources, such as user device 1. The resource grant message may include several fields, including information identifying the sending BS (e.g., BSID for BS1), information identifying the user device to which the resource grant is directed (e.g., user device ID for user device 1), and information identifying the resources that have been scheduled or reserved for the user device (e.g., time slots, symbols, . . . scheduled for the user device 1 to perform uplink transmission to BS1 in this example). In response to receiving the resource grant, at 220, user device 1 may then transmit data in an uplink direction to BS1. Other user devices may similarly transmit data via granted resources. Also, BS1 may transmit downlink via resourced scheduled as part of the scheduled aggregate resources identified in the resource scheduling announcement(s).

In an example implementation, the resource request from a user device and the resource grant sent to the user device may be RAT-specific, while the resource scheduling announcement(s) may be RAT-neutral or RAT-specific. Also, the resource scheduling announcement(s) may be sent via a portion of the group of resources shared by at least two BSs that implement different RATs (e.g., first example implementation, or example implementation 1), or may be sent via resources, either wired or wireless, that are outside of the group of resources shared by the BSs (e.g., second example implementation or implementation 2). In an example implementation, BS1 may receive resource requests from a plurality of user devices, and may combine or aggregate these resource request into one resource scheduling announcement (or a resource scheduling announcement for each RAT). In other words, the resources identified in each of the resource scheduling announcements (e.g., at 214, 216) identifies an aggregate or total resources scheduled by the BS1, including resources requested by each user device to BS1. Therefore, BS1 may combine multiple resource requests, and then submit one (or more) resource scheduling announcements that identify the aggregate (or total) resources that have been scheduled by BS1.

Referring to FIG. 2, the other BSs may similarly receive resource requests from one or more user devices, or determine that the BS needs downlink resources, and may send a resource scheduling announcement to one or more BSs, and then may send a resource grant to the requesting user devices.

For example, BS3 may receive a resource request from user device 3 at 221. BS3 may schedule resources at 222, and then send a resource scheduling announcement to BS2 (or RAT 2 BSs) at 224 and send a resource scheduling announcement to BS1 (or RAT 1 BSs) at 226, identifying the wireless resources that have been scheduled for BS3. BS3 may then transmit a resource grant at 228 to a requesting user device 3, and at 230, user device 3 may transmit data via scheduled/granted resources. Similarly, BS2 may schedule downlink resources for itself at 232. BS2 may then send resource scheduling announcements to BS1 at 234 and to BS3 at 236. Because in this case, the scheduled resources are only downlink resources for BS2, no resource grant message is necessary, and the BS2 may then transmit data via the scheduled resources at 238.

Other example implementations will be described below with reference to FIGS. 3 and 4 and are similar in several respects to the above-described first and second example implementations associated with FIG. 2. The differences (as compared to the first and second example implementations of FIG. 2) will be briefly noted below with respect to the third, fourth and fifth example implementations that are shown in FIGS. 3 and 4.

Figure 3:
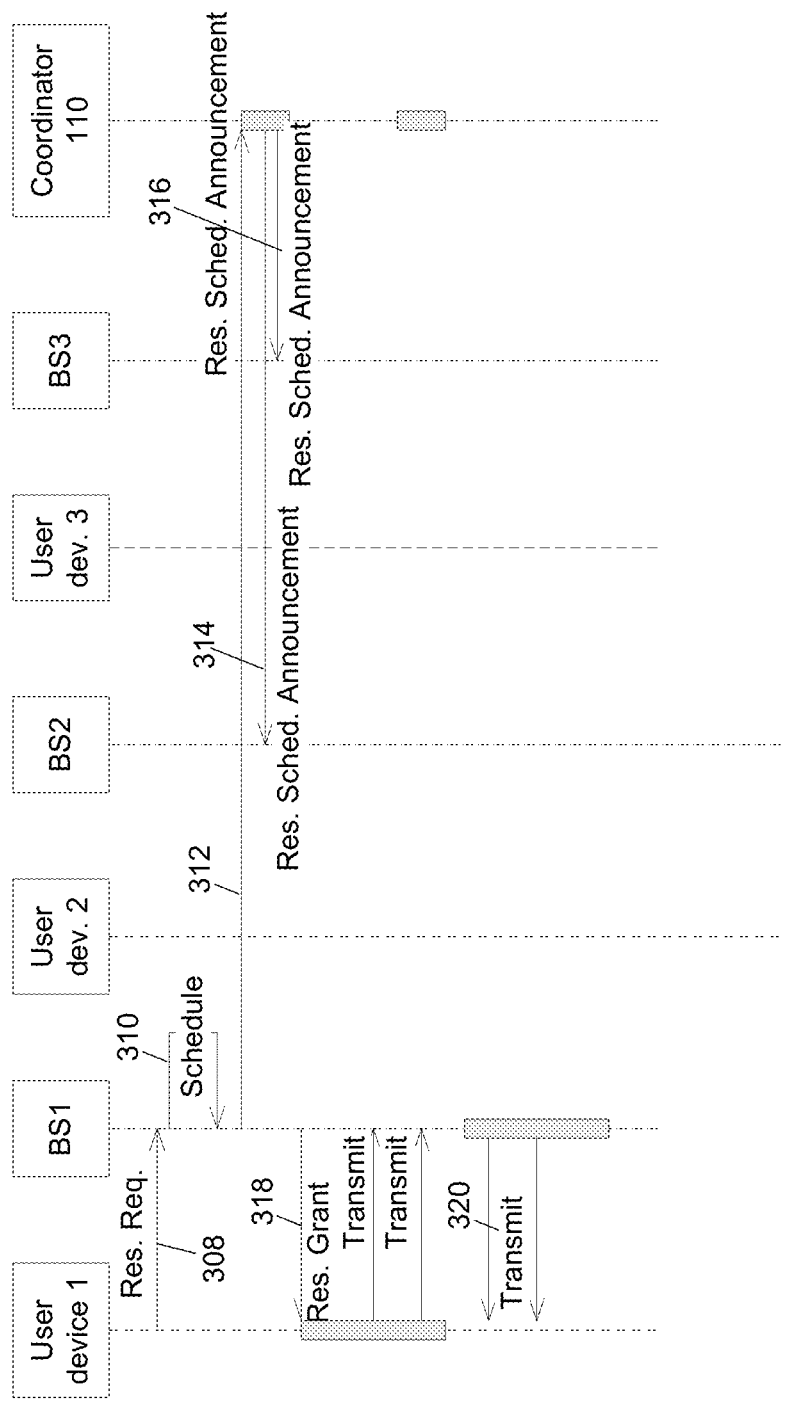
FIG. 3 is a signal diagram illustrating operation of a third example implementation.

FIG. 3 is a signal diagram illustrating operation of a third example implementation. In this example implementation, an multi-RAT coordinator 110 is provided to relay or forward the resource scheduling information, which was received via a first resource scheduling announcement, to other RATs/BSs.

Referring to FIG. 3, at 308, BS1 may receive a resource request from user device 1, and/or may determine that it (BS1) needs downlink resources. At 310, BS1 may select and schedule aggregate resources based on resource requests received from one or more user devices and/or resources needed by BS1. At 312, BS1 (implementing RAT 1) may send a first resource scheduling announcement, provided in accordance with RAT 1, to multi-RAT coordinator 110. In this example implementation (a third example implementation), the multi-RAT coordinator 110 does not schedule resources or even confirm scheduled resources, but merely may perform RAT conversion of the announcement and announcement forwarding functions. Thus, according to an example implementation, multi-RAT coordinator 110 may perform inter-RAT conversion of resource scheduling announcements and other messages, or may receive a first message via a first RAT, and generate a second message via a second RAT that may include one or more fields from the first message (e.g., a resources field, and BSID to identify the scheduling or requesting BS for which the resources have been allocated or scheduled). For example, multi-RAT coordinator 110 may receive the first resource scheduling announcement at 312, which is provided in accordance with RAT 1, e.g., a message that has fields, format, etc. in accordance with requirements of RAT 1, for example. For example, the resource scheduling announcement at 312 may identify BS1 (for which the resources are scheduled) and the resources that are (or have been) scheduled by BS1 for BS1. A location (e.g., GPS coordinates) of BS1 (and associated with a pre-exchanged range or area) or a geographic area may also be included in the first resource scheduling announcement.

Multi-RAT coordinator 110 may perform RAT conversion by extracting one or more fields (e.g., BSID of BS1, information identifying the resources, and/or location of BS1 or geographic area of BS1) from the first resource scheduling announcement. The multi-RAT coordinator 110 may then generate and transmit a second resource scheduling announcement at 314 to BS2 that includes one or more of the extracted fields (although possibly provided in a different format) and provided in accordance with RAT 2. Similarly, multi-RAT coordinator 110 may also generate and transmit a third resource scheduling announcement at 316 to BS3 that includes one or more of the extracted fields (although possibly provided in a different format) and provided in accordance with RAT 3. The first, second and third resource scheduling announcements (at 312, 314 and 316) may be sent via a same communications medium (which may be a portion of the group of shared resources shared by the multiple BSs implementing different RATs, or may be outside of the shared resources), or may be sent via different communications media. For example, the first resource scheduling announcement may be provided in accordance with LTE and sent via Ethernet; the second resource scheduling announcement may be sent in accordance with WLAN and sent via shared wireless resources; and the third resource scheduling announcement may be provided in accordance with a wireless paging RAT implemented by a hospital and sent via T1 connection. This is merely one illustrative example, and other RATs, communications media, and other details may be different.

Next, with reference to FIG. 3, at 318, BS1 sends a resource grant to user device 1, including information identifying BS1 (BSID of the BS granting the resources), information identifying user device 1 (user device to which the resource grant is addressed/directed), and an identification of the resources granted or allocated to user device 1. At 320, user device 1 may transmit uplink to BS1 using the resources granted to user device 1. Likewise, at 322, BS1 may transmit downlink to one or more user devices (including user device 1) using the scheduled resources.

Although not shown in FIG. 3, the other BSs may similarly send a first resource scheduling announcement to multi-RAT coordinator 110. Multi-RAT coordinator 110 may then extract one or more fields, and then generate and send one or more additional resource scheduling announcements to other BSs and/or in accordance with other RATs, for example.

Figure 4:
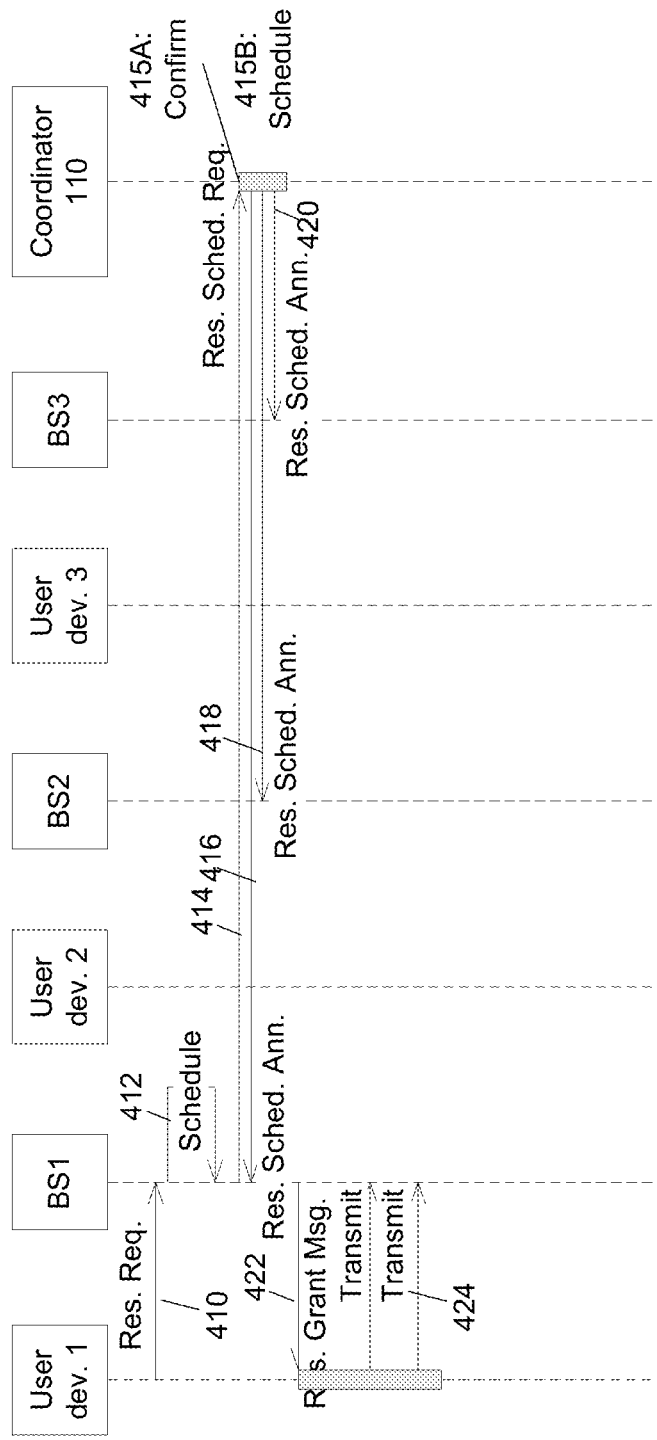
FIG. 4 is a signal diagram illustrating operation of a fourth example implementation and a fifth example implementation.

FIG. 4 is a signal diagram illustrating operation of a fourth example implementation and a fifth example implementation. In the fourth example implementation, a BS schedules aggregate resources, e.g., based on resource requests from one or more user devices and/or based on a need of the BS, and the multi-RAT coordinator 110 confirms availability of the aggregate resources requested via a resource scheduling request, and then sends resource scheduling announcement(s) to one or more BSs to announce the scheduled resources. In the fifth example implementation, the multi-RAT coordinator 110 performs the scheduling of aggregate resources for a BS in response to a resource scheduling request from the BS, and then the multi-RAT coordinator 110 sends resource scheduling announcement(s) to one or more BSs to announce the scheduled resources. Other BSs may then update their maintained list of available resources to reflect that such scheduled resources are occupied or unavailable.

At 410, BS1 receives a resource request from a user device 1 requesting resources for uplink transmission. BS1 may also determine its own need for downlink resources for transmission to one or more user devices.

At 412, for the fourth implementation, BS1 schedules aggregate resources based on resource requests from one or more user devices and based on its own need for downlink resources. The scheduling of resources may include identifying specific resources, e.g., specific time slots, symbols, etc. to fulfill the aggregate resource requests.

At 414, for the fourth example implementation, BS1 sends a resource scheduling request to multi-RAT coordinator 110, including, for example, information identifying BS1, e.g., BSID for the requesting BS, and information identifying the requested resources, e.g., identification of specific time slots, symbols or other requested resources. Other fields may also be included.

At 415A, for the fourth example implementation, the multi-RAT coordinator 110 may confirm that the requested resources are available, e.g., by comparing the requested resources to a list of available resources maintained by the multi-RAT coordinator 110. Such list of available resources may be maintained by multi-RAT coordinator 110, since in the fourth and fifth example implementations, all resource scheduling requests are, for example, first sent to the multi-RAT coordinator 110.

Operations for 412, 414 and 415 may be different for the fifth example implementation. At 412, for the fifth example implementation, the BS1 does not schedule or identify specific resources, but determines the aggregate or total resources that will be requested, or the amount of data to be transmitted, and/or transmission priority. At 414, the BS1 may then send a resource scheduling request to the multi-RAT coordinator 110, including, for example, information identifying BS1, e.g., BSID for the requesting BS, and information identifying an amount of resources requested or an amount of data to be transmitted in the uplink and/or downlink directions, and provided in accordance with RAT 1, for example.

At 415B, the multi-RAT coordinator schedules resources (e.g., identifies specific frequencies/carriers, time slots, symbols, etc.) based on the resource scheduling request at 414 (e.g., identifying an amount of requested resources or an amount of data to be transmitted) and the available resources.

If the requested resources are confirmed as available by multi-RAT coordinator 110 (for the fourth example implementation), or after the resources have been scheduled by multi-RAT coordinator 110 (for the fifth example implementation), then at 416, the multi-RAT coordinator 110 may send a resource scheduling announcement to BSs implementing RAT 1 including BS1. At 418, the multi-RAT coordinator 110 may send a resource scheduling announcement to BSs implementing RAT 2, including BS2. And at 420, the multi-RAT coordinator 110 may send a resource scheduling announcement to BSs implementing RAT 3, including BS3. Each of the resource scheduling announcements (at 416, 418, 420) may include, for example, information identifying the scheduled resources and information identifying the BS (e.g., BSID for BS1) for which the identified resources have been scheduled.

Figure 5:
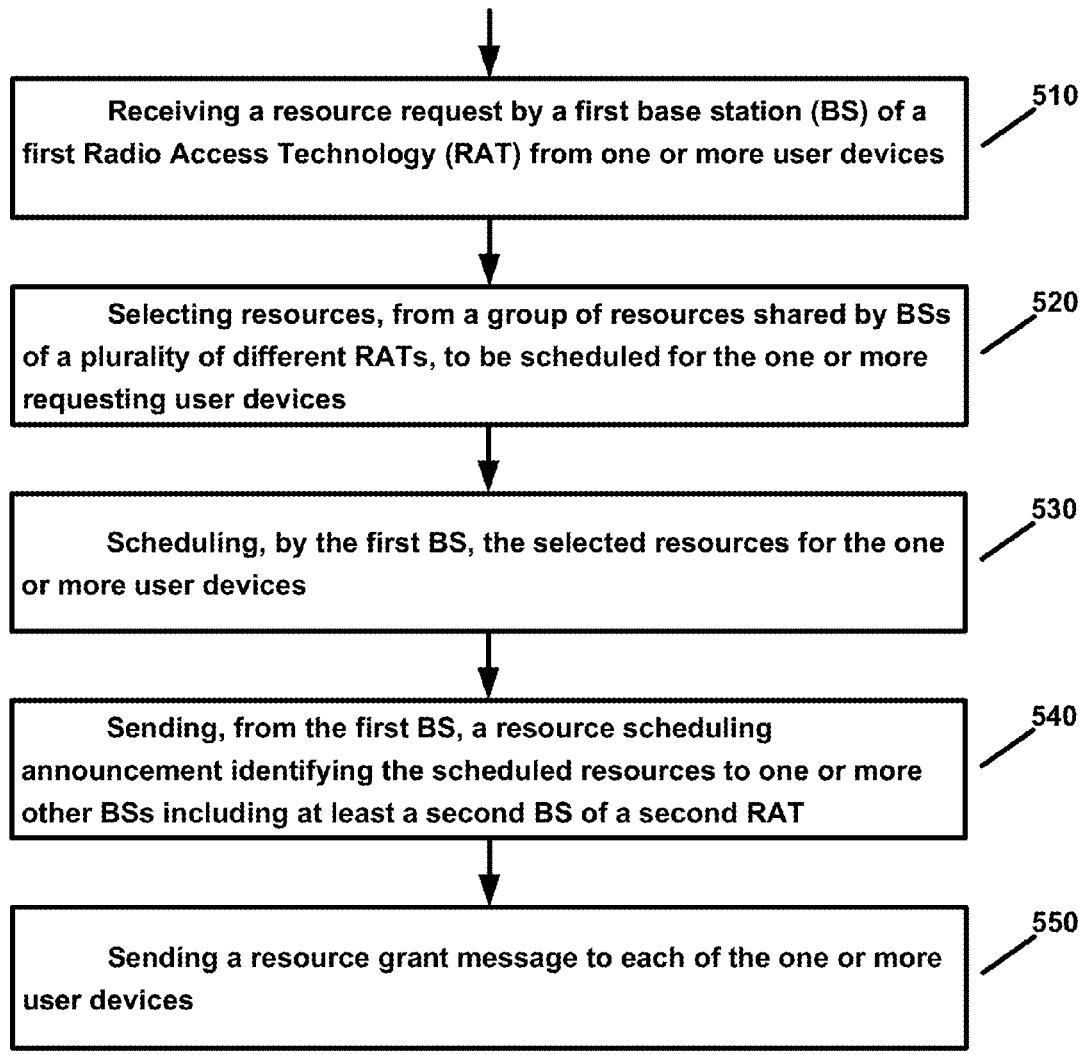
FIG. 5 is a flow chart illustrating operation of a base station according to an example implementation.

FIG. 5 is a flow chart illustrating operation of a base station according to an example implementation. Operation 510 includes receiving a resource request by a first base station (BS) of a first Radio Access Technology (RAT) from one or more user devices. Operation 520 includes selecting resources, from a group of resources shared by BSs of a plurality of different RATs, to be scheduled for the one or more requesting user devices. Operation 530 includes scheduling, by the first BS, the selected resources for the one or more user devices. Operation 540 includes sending, from the first BS, a resource scheduling announcement identifying the scheduled resources to one or more other BSs including at least a second BS of a second RAT. And, operation 550 includes sending a resource grant message to each of the one or more user devices.

Figure 6:
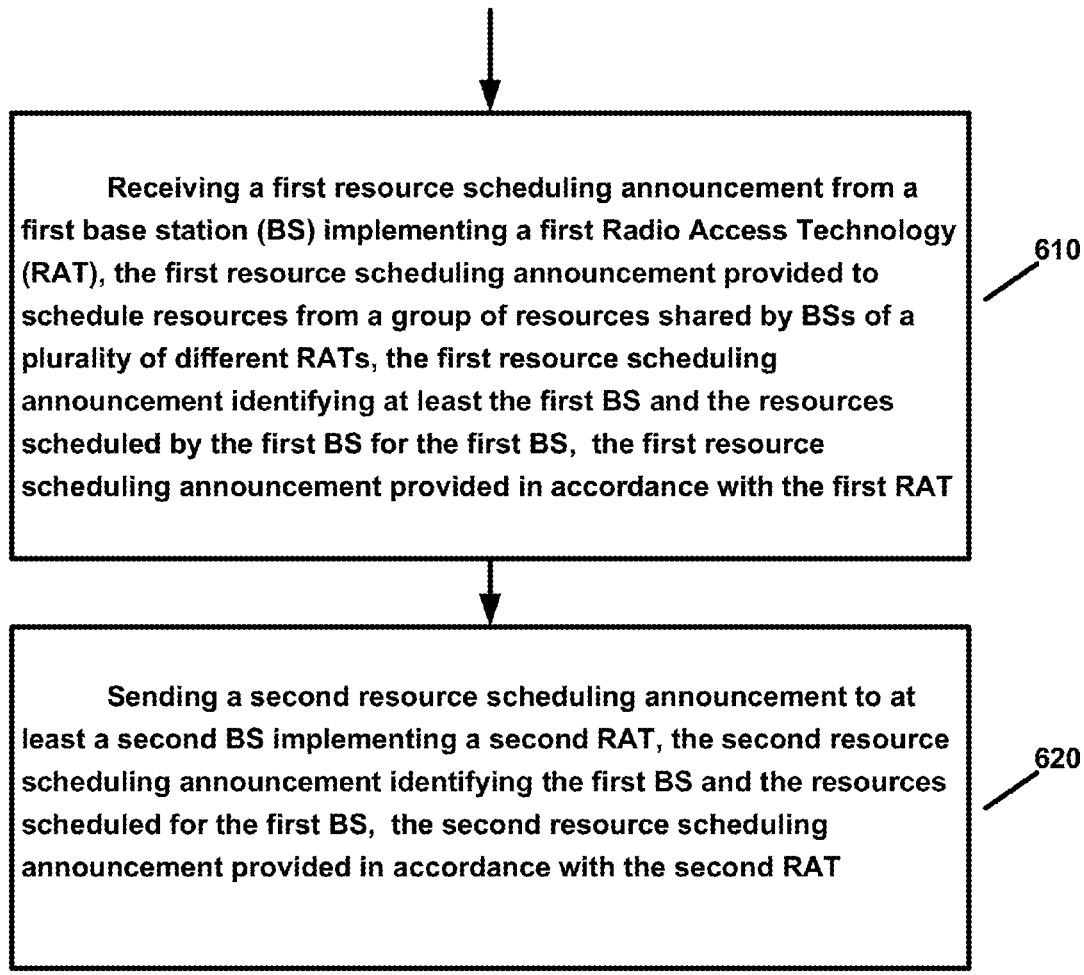
FIG. 6 is a flow chart illustrating operation of a multi-RAT coordinator according to another example implementation.

FIG. 6 is a flow chart illustrating operation of a multi-RAT coordinator according to another example implementation. Operation 610 includes receiving a first resource scheduling announcement from a first base station (BS) implementing a first Radio Access Technology (RAT), the first resource scheduling announcement provided to schedule resources from a group of resources shared by BSs of a plurality of different RATs, the first resource scheduling announcement identifying at least the first BS and the resources scheduled by the first BS for the first BS, the first resource scheduling announcement provided in accordance with the first RAT. Operation 620 includes sending a second resource scheduling announcement to at least a second BS implementing a second RAT, the second resource scheduling announcement identifying the first BS and the resources scheduled for the first BS, the second resource scheduling announcement provided in accordance with the second RAT.

Figure 7:
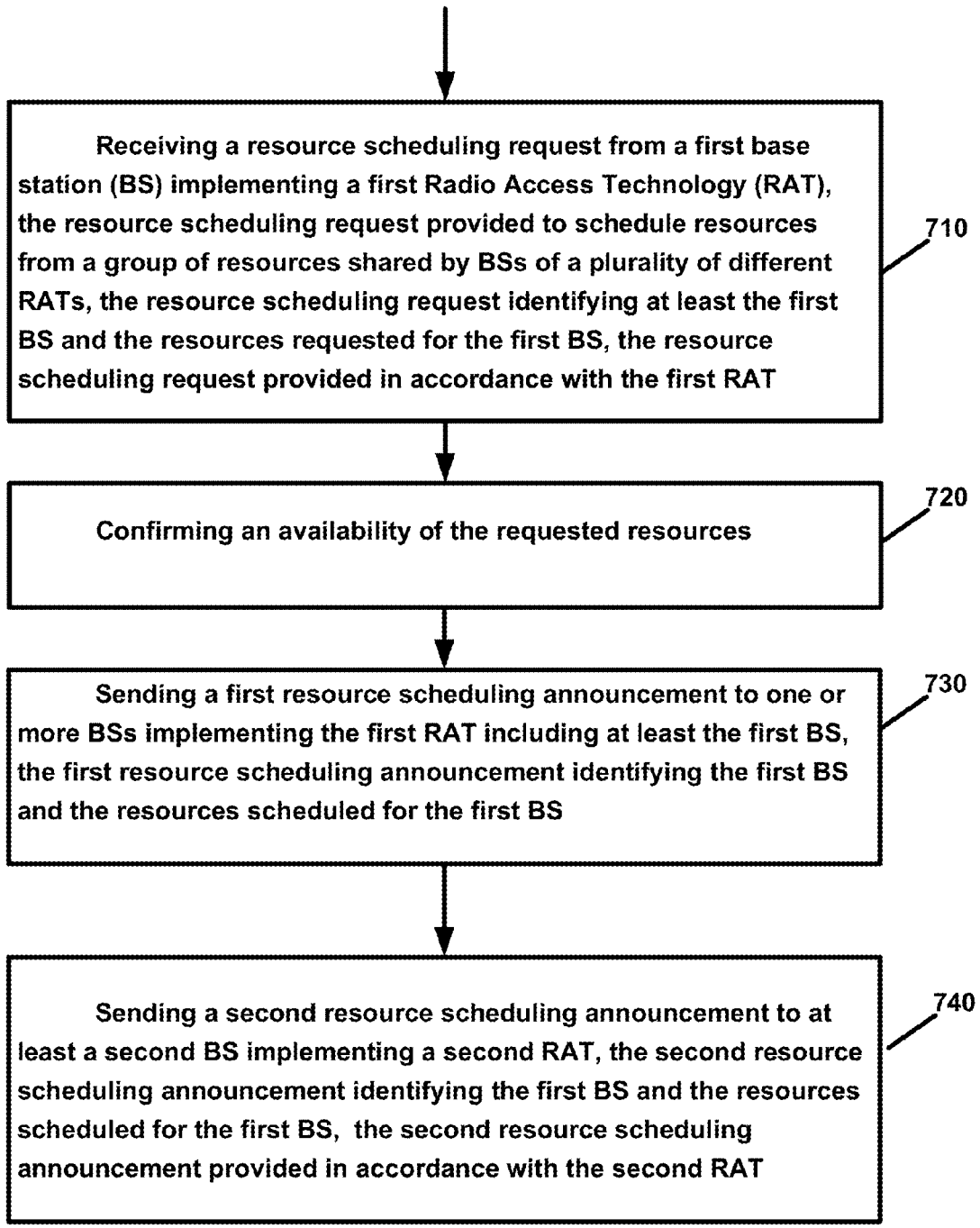
FIG. 7 is a flow chart illustrating operation of a multi-RAT coordinator according to another example implementation.

FIG. 7 is a flow chart illustrating operation of a multi-RAT coordinator according to another example implementation. Operation 710 includes receiving a resource scheduling request from a first base station (BS) implementing a first Radio Access Technology (RAT), the resource scheduling request provided to schedule resources from a group of resources shared by BSs of a plurality of different RATs, the resource scheduling request identifying at least the first BS and the resources requested for the first BS, the resource scheduling request provided in accordance with the first RAT. Operation 720 includes confirming an availability of the requested resources. Operation 730 includes sending a first resource scheduling announcement to one or more BSs implementing the first RAT including at least the first BS, the first resource scheduling announcement identifying the first BS and the resources scheduled for the first BS. And, operation 740 includes sending a second resource scheduling announcement to at least a second BS implementing a second RAT, the second resource scheduling announcement identifying the first BS and the resources scheduled for the first BS, the second resource scheduling announcement provided in accordance with the second RAT.

Figure 8:
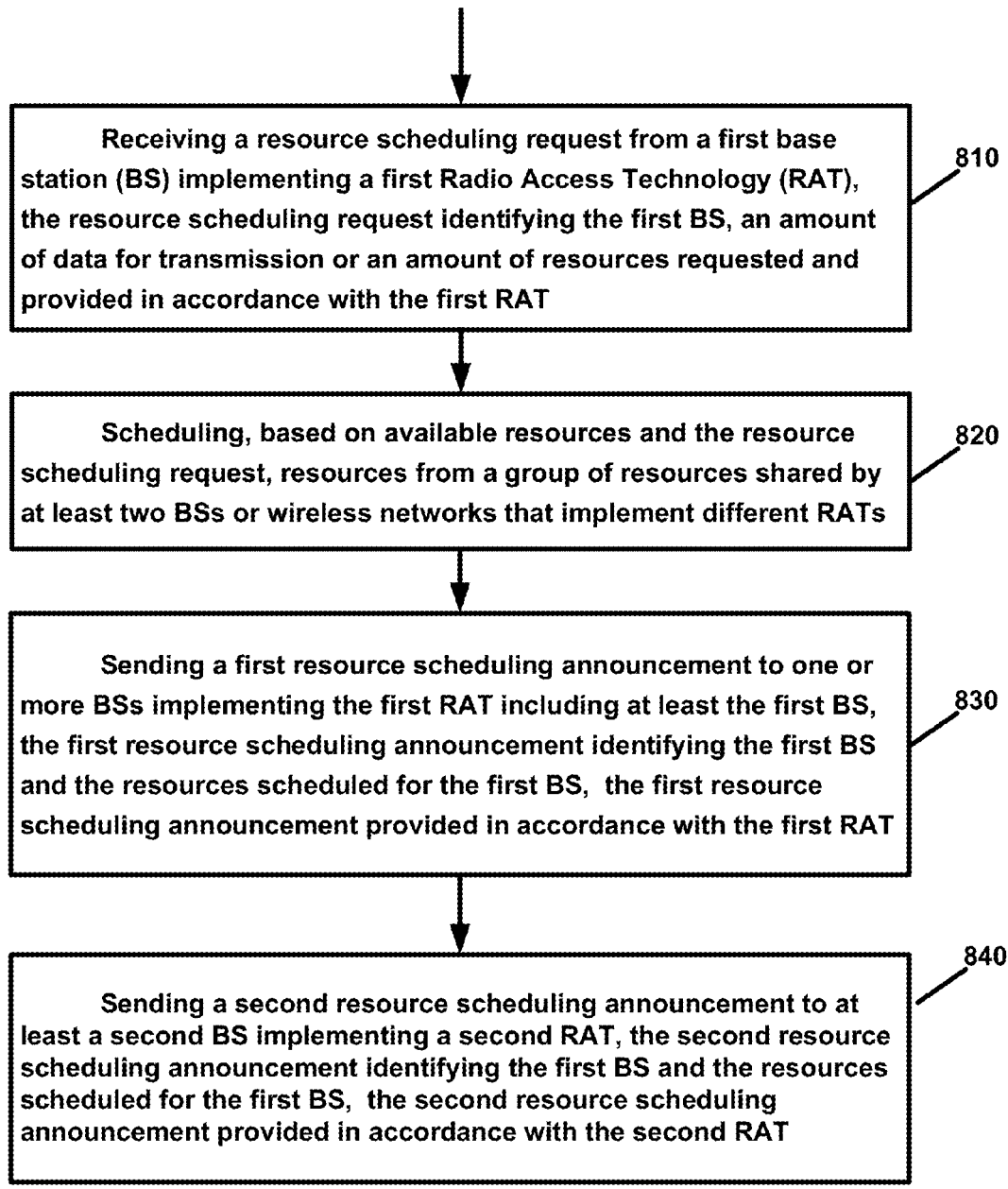
FIG. 8 is a flow chart illustrating operation of a multi-RAT coordinator according to another example implementation.

FIG. 8 is a flow chart illustrating operation of a multi-RAT coordinator according to another example implementation. Operation 810 includes receiving a resource scheduling request from a first base station (BS) implementing a first Radio Access Technology (RAT), the resource scheduling request identifying the first BS, an amount of data for transmission or an amount of resources requested and provided in accordance with the first RAT. Operation 820 includes scheduling, based on available resources and the resource scheduling request, resources from a group of resources shared by at least two BSs or wireless networks that implement different RATs. Operation 830 includes sending a first resource scheduling announcement to one or more BSs implementing the first RAT including at least the first BS, the first resource scheduling announcement identifying the first BS and the resources scheduled for the first BS, the first resource scheduling announcement provided in accordance with the first RAT. Operation 840 includes sending a second resource scheduling announcement to at least a second BS implementing a second RAT, the second resource scheduling announcement identifying the first BS and the resources scheduled for the first BS, the second resource scheduling announcement provided in accordance with the second RAT.

Figure 9:
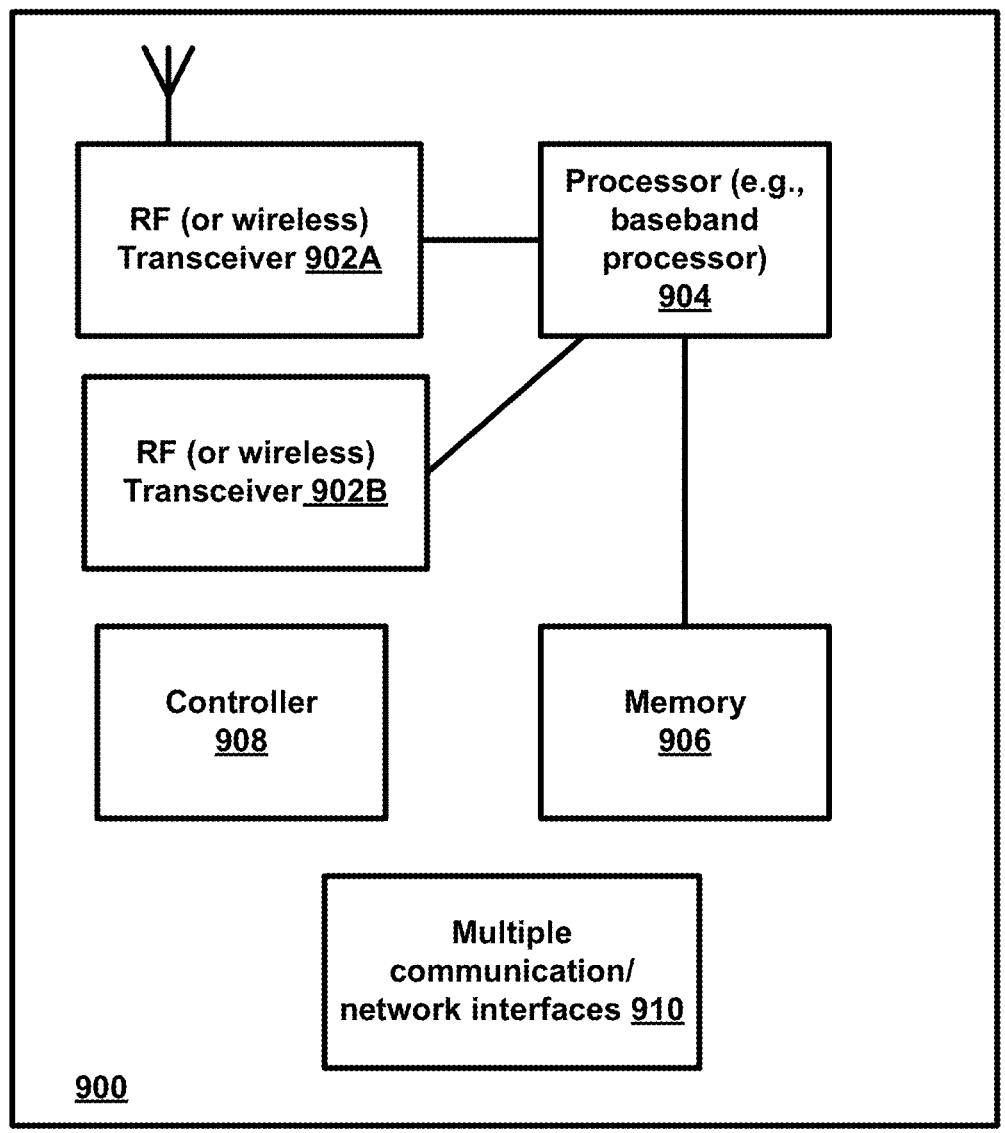
FIG. 9 is a block diagram of a wireless station (e.g., BS or user device or multi-RAT coordinator) 900 according to an example implementation.

FIG. 9 is a block diagram of a wireless station (e.g., a BS or a user device, a multi-RAT coordinator 110, or other communications device) 900 according to an example implementation. The wireless station 900 may include, for example, two RF (radio frequency) or wireless transceivers 902A, 902B, where each wireless transceiver includes a transmitter to transmit signals and a receiver to receive signals. An antenna may be provided for each wireless transceiver. The wireless station also includes a processor 904 to execute instructions or software and control transmission and receptions of signals, and a memory 906 to store data and/or instructions. A protocol stack for each of multiple RATs may be stored in memory 906, and executed by processor 904, for example. Also, a wireless transceiver, e.g., 902A, 902B, . . . , may be provided for each of multiple RATs. For example, wireless transceiver 902A may be provided for LTE; wireless transceiver 902B may be provided for WLAN; a wireless transceiver 902C (not shown) may be provided for a wireless paging system used by a hospital; and, a wireless transceiver 902D (not shown) may be provided for Wi-Max, etc. Other (or different) wireless transceivers may be provided, as these are merely some examples. In this manner, for some example implementation(s), a BS, or a multi-RAT coordinator 110, or other communications device, may communicate with BSs or other devices of multiple RATs, e.g., at the same time or at different times.

Also, multiple communications or network interfaces 910 are provided to allow the wireless station 900 to communicate via different communications media, e.g., as required by different RATs. For example, network interfaces 910 may include an Ethernet interface, a T1 network interface (as some examples), and other wired network interfaces. The wireless transceivers 902 may be considered different wireless interfaces, according to an example implementation.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902. Processor 904 may control transmission of signals or messages over a wireless network, and may receive signals or messages, etc., via a wireless network (e.g., after being downconverted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of coordinating usage of wireless resources comprising:
   receiving a resource request by a first base station (BS) of a first Radio Access Technology (RAT) from one or more user devices;
   receiving at least one resource scheduling announcement from one or more other BSs, each resource scheduling announcement identifying resources scheduled by the one or more other BSs;
   selecting resources, from a group of resources shared by BSs of a plurality of different RATs, to be scheduled for the one or more requesting user devices by taking into account the resources scheduled by the one or more other BSs;
   scheduling, by the first BS, the selected resources for the one or more user devices;
   sending, from the first BS, a resource scheduling announcement identifying the scheduled resources to the one or more other BSs including at least a second BS of a second RAT; and
   sending a resource grant message to each of the one or more user devices.

2. The method of claim 1 wherein the selecting resources comprises selecting aggregate resources that include wireless resources for uplink communications from one or more user devices to the first BS and wireless resources for downlink communications from the first BS to one or more user devices, wherein the resource request and the resource grant message are specific to the first RAT.

3. The method of claim 1 wherein the resource scheduling announcement is RAT-neutral.

4. The method of claim 1 wherein the method comprises:
   receiving a resource request by the first BS of the first RAT from a plurality of user devices;
   selecting aggregate resources, from the group of resources shared by BSs of a plurality of different RATs, to be scheduled for the plurality of requesting user devices;
   scheduling, by the first BS, the selected aggregate resources for the plurality of user devices, wherein the scheduled aggregate resources including an aggregate of resources to be scheduled for or granted to each requesting user device; and
   sending a resource scheduling announcement identifying the scheduled aggregate resources to one or more other BSs including at least a second BS of a second RAT.

5. The method of claim 1:
   wherein the scheduling announcement comprises:
   information identifying the scheduled resources;
   information identifying the first BS that is sending the scheduling announcement; and
   information identifying a coverage area for the scheduled resources.

6. The method of claim 1 wherein the sending the resource scheduling announcement comprises:
   sending, from the first BS via a portion of the group of resources shared by BSs of a plurality of different RATs, the resource scheduling announcement identifying the scheduled resources to one or more other BSs including at least the second BS of the second RAT.

7. The method of claim 1 wherein the sending the resource scheduling announcement comprises:
   sending, from the first BS via resources, either wired or wireless, outside of the group of resources shared by BSs of a plurality of different RATs, the resource scheduling announcement identifying the scheduled resources to one or more other BSs including at least the second BS of the second RAT.

8. A method of coordinating usage of wireless resources comprising:
   receiving a first resource scheduling announcement from a first base station (BS) implementing a first Radio Access Technology (RAT), the first resource scheduling announcement provided to schedule resources from a group of resources shared by BSs of a plurality of different RATs, the first resource scheduling announcement identifying at least the first BS and the resources scheduled by the first BS for the first BS, the first resource scheduling announcement provided in accordance with the first RAT;
   sending a second resource scheduling announcement to at least a second BS implementing a second RAT, the second resource scheduling announcement identifying the first BS and the resources scheduled for the first BS, the second resource scheduling announcement provided in accordance with the second RAT, wherein the second resource scheduling announcement is provided to the at least a second BS in order to enable the at least a second BS to perform scheduling by taking into account the scheduling of the first base station.

9. The method of claim 8 wherein the sending comprises:
   generating the second resource scheduling announcement based on one or more fields included in the first resource scheduling announcement and requirements of the second RAT; and
   sending the generated second resource scheduling announcement to at least a second BS implementing a second RAT.

10. The method of claim 8:
wherein the first resource scheduling announcement includes a plurality of fields provided in a format in accordance with requirements of or a specification of the first RAT; and
wherein the second resource scheduling announcement includes a plurality of fields provided in a format in accordance with requirements of or a specification of the second RAT.

11. The method of claim 8:
wherein the first resource scheduling announcement is received from the first BS via a first communications medium and a first communications protocol; and
wherein the second resource scheduling announcement is received from the first BS via a second communications medium and a second communications protocol.

12. The method of claim 11 wherein the first communications medium and the first communications protocol are different from the second communications medium and the second communications protocol, respectively.

13. A method of coordinating usage of wireless resources comprising:
receiving a resource scheduling request from a first base station (BS) implementing a first Radio Access Technology (RAT), the resource scheduling request provided to schedule resources from a group of resources shared by BSs of a plurality of different RATs, the resource scheduling request identifying at least the first BS and the resources requested for the first BS, the resource scheduling request provided in accordance with the first RAT;
confirming an availability of the requested resources;
sending a first resource scheduling announcement to one or more BSs implementing the first RAT including at least the first BS, the first resource scheduling announcement identifying the first BS and the resources scheduled for the first BS; and
sending a second resource scheduling announcement to at least a second BS implementing a second RAT, the second resource scheduling announcement identifying the first BS and the resources scheduled for the first BS, the second resource scheduling announcement provided in accordance with the second RAT, wherein the second resource scheduling announcement is provided to the at least a second BS in order to enable the at least a second BS to perform scheduling by taking into account the scheduling of the first base station.

14. The method of claim 13 wherein the resource scheduling request requests aggregate resources based on resource requests from each of a plurality of user devices to the first BS.

15. The method of claim 13 and further comprising updating a list of available resources to reflect that the requested resources will be unavailable or occupied.

16. The method of claim 13 wherein:
the sending the first resource scheduling announcement to one or more BSs implementing the first RAT including at least the first BS comprises sending, via a first communications medium, the first resource scheduling announcement to one or more BSs implementing the first RAT including at least the first BS, the first resource scheduling announcement being in accordance with requirements or a specification of the first RAT; and
the sending the second resource scheduling announcement to one or more BSs implementing the second RAT comprises sending, via a second communications medium, the second resource scheduling announcement to one or more BSs implementing the second RAT, the second resource scheduling announcement being in accordance with requirements or a specification of the second RAT.

17. The method of claim 13 wherein the confirming comprises:
comparing the requested resources to a list of available resources of the group of resources shared by BSs of a plurality of different RATs; and
confirming the availability of the requested resources based on the comparing.

18. The method of claim 13 and further comprising:
receiving a resource scheduling request from a third base station (B S) implementing the second RAT for the same requested resources as requested by the first B S; and
wherein the confirming comprises allocating the requested resources, if available, to either the first BS or the third BS based on a priority for each.

19. The method of claim 18 wherein the priority comprises at least one of:
a priority included within each of the resource scheduling requests;
a priority for each of the first B S and the third B S;
a RAT priority for each of the first RAT and the second RAT;
a system priority for each of the first BS and the third BS, where the first BS is part of a first wireless system that implements the first RAT, and the third B S is part of a second wireless system that implements the second RAT.

20. An apparatus comprising at least one processor and at least one memory including computer instructions, when executed by the at least one processor, cause the apparatus to:
receive a resource request by a first base station (B S) of a first Radio Access Technology (RAT) from one or more user devices;
receive at least one resource scheduling announcement from one or more other BSs, each resource scheduling announcement identifying resources scheduled by the one or more other BSs;
select resources, from a group of resources shared by BSs of a plurality of different RATs, to be scheduled for the one or more requesting user devices by taking into account the resources scheduled by the one or more other BSs;
schedule, by the first BS, the selected resources for the one or more user devices;
send, from the first BS, a resource scheduling announcement identifying the scheduled resources to the one or more other BSs including at least a second BS of a second RAT; and
send a resource grant message to each of the one or more user devices.

* * * * *